United States Patent [19]

Nicolle et al.

[11] 4,000,033
[45] Dec. 28, 1976

[54] REMOVAL OF COLOR AND ORGANIC MATTER FROM KRAFT PROCESS BLEACH EFFLUENTS

[75] Inventors: François Marcel André Nicolle, Hawkesbury; John Allan Histed, L'Original; K. Vittal Nayak, Hawkesbury, all of Canada

[73] Assignee: Canadian Patents and Development Limited, Ottawa, Canada

[22] Filed: Mar. 7, 1975

[21] Appl. No.: 556,308

Related U.S. Application Data

[63] Continuation-in-part of Ser. No. 381,612, July 23, 1973, abandoned.

[30] Foreign Application Priority Data

Apr. 25, 1973  Canada .................. 169541

[52] U.S. Cl. .................. 162/29; 210/42 R; 210/53
[51] Int. Cl.² .................................. C02C 5/02
[58] Field of Search .......... 162/29, 16, 49, DIG. 8; 210/42, 51, 52, 53

[56] References Cited

UNITED STATES PATENTS

| | | | |
|---|---|---|---|
| 2,043,458 | 6/1936 | Windecker et al. ............ | 210/42 X |
| 3,652,407 | 3/1972 | Paleous ......................... | 162/30 X |
| 3,729,375 | 4/1973 | Chappelle ...................... | 162/49 X |
| 3,736,254 | 5/1973 | Croom ........................... | 210/51 |

FOREIGN PATENTS OR APPLICATIONS 589,807  12/1959  Canada .................. 162/DIG. 8

*Primary Examiner*—S. Leon Bashore
*Assistant Examiner*—Peter F. Kratz
*Attorney, Agent, or Firm*—Christen & Sabol

[57] ABSTRACT

In a typical pulp mill bleaching process, a pulp slurry is subjected to one or more chlorination treatments, each being followed by a caustic extraction stage. To decrease the volume of effluents, water re-use is practiced with a portion of the first caustic extraction stage filtrate being reused for direct countercurrent washing to increase the concentration of the filtrate and the balance thereof being removed as a concentrated caustic extraction effluent. According to the novel feature, the caustic extraction effluent removed, having a pH of about 9 to 12, is combined with an acidic solution having a pH of less than about 1.5 to form a combined effluent having a volume of less than about 2500 gallons per air dried ton of bleached pulp and a pH below about 2.8, whereby a precipitate is formed which removes organic color bodies from the combined effluent. Part or all of the acidic solution is preferably a concentrated chlorination effluent obtained by recycle of the chlorination stage washer filtrate. The thus treated effluent has reduced color and this significantly reduces the chemical requirements for further color removal by other processes, e.g., lime treatment, alum coagulation, carbon absorption, etc.

8 Claims, 3 Drawing Figures

REMOVAL OF COLOR AND ORGANIC MATTER FROM KRAFT PROCESS BLEACH EFFLUENTS

This is a continuation-in-part of our earlier filed U.S. application Ser. No. 381,612, filed July 23, 1973 and now abandoned.

BACKGROUND OF THE INVENTION

1. Field of the Invention

This invention relates to a process for removing color and organic matter from wood pulp bleaching effluents, and particularly from effluents obtained from the bleaching of wood pulp produced by the kraft process.

2. Description of the Prior Art

As is well known, in the bleaching of pulp produced by the kraft process, a procedure is employed which involves contacting the pulp with a chlorinating agent, such as chlorine, chlorine dioxide, hypochlorite, or other chlorinating or bleaching agents. The lignin, tannin and other color imparting constituents in the pulp are chlorinated or reacted with the bleaching agent and are then removed from the pulp by washing the pulp with an alkali such as caustic soda. Several additional stages may be used, but the caustic wash effluent obtained is highly colored and may be responsible for as much as 80 percent of the total color discharged in the kraft pulping process effluents.

Large quantities of water are used in the pulping and bleaching of wood fibers and this results in the production of very large volumes of highly colored waste effluents. The disposal of these waste effluents has become one of the most serious problems facing the pulping industry today. This is particularly true of the colored liquid effluents from the bleaching process, especially where such effluents are discharged into bodies of water serving as municipal or industrial water sources. The problem has become even more critical in recent years as more and more governmental bodies adopt and enforce strict pollution laws.

This has resulted in a very large amount of research activity and there are now many proposals in the literature for the treatment of bleach plant effluents. Most of these are concerned with color removal of the first caustic wash stage effluent since it is the main source of color bodies originating during the bleaching operation. Acidic effluents, mainly composed of chlorination stage effluents, are usually neutralized before going to an aeration lagoon.

The most widely used method of decolorization at this time is lime treatment at a pH of about 11.5. Because of this pH, the technique is for economic reasons restricted to the caustic wash effluent. While the lime treatment has some merits, it also has the very distinct disadvantages that very large quantities of lime must be used and, moreover, the degree of color removal is not nearly as effective as is desired.

Other proposals for removing color material from the first caustic wash stage effluent have included alum coagulation, adsorption on resin or activated carbon and solvent extraction with high molecular weight amines.

As an example of a recent proposal for treatment of the caustic wash effluent there can be mentioned Gould's U.S. Pat. No. 3,531,370 issued Sept. 29, 1970. In that case about 500 to 2500 parts by weight of the lime were used per 1,000,000 parts of effluent but it was found to be essential to intermix cellulosic fibers into the effluent in sufficient amount to obtain effective settling. It was also found to be desirable to add lime mud from the mill recovery system to further improve settling.

Another recent proposal is described in Paleos U.S. Pat. No. 3,652,407 issued Mar. 28, 1972. In that case the caustic wash effluent from the bleaching stage is once again first treated with lime to remove at least a portion of the color bodies. After the lime treatment the caustic wash effluent is then acidified by mixing with a colored effluent from the chlorination stage and thereafter passing the combined effluents through a macroreticular adsorbent resin.

It is the object of the present invention to provide an improved procedure for removal of part of the color and organic materials from the bleaching stage effluents which will minimize the requirement of additional chemicals for color removal while also minimizing the amount of total bleachery effluent.

SUMMARY OF THE INVENTION

In a pulp mill bleaching process, a pulp slurry is subjected to one or more chlorination treatments and one or more caustic extraction treatments, with each such treatment being immediately followed by a washing and filtration stage. According to this invention, it has been surprisingly found that if the first caustic wash effluent is highly concentrated and this is combined with an acidic component to form a concentrated mixture which is highly acidic, a fast settling precipitate of modified lignin materials containing organic color bodies is formed. The removal of this precipitate from the effluent results in much reduced color and reduced chemical oxygen demand (COD). This removal of color has a very significant effect on the cost of further color removal by other processes such as lime treatment, alum coagulation, carbon absorption, etc.

In order for a precipitate to form it is necessary that both the caustic wash effluent and the acidic component have a certain minimum degree of concentration before combining and also that the pH of the combined effluent be below about 2.8. Thus, even though the combined effluent has a pH below 2.8, no precipitate will form if the combination of components is too dilute. Likewise, with the concentrations above the minimum, no precipitate will form until the pH of the combined effluent drops below 2.8.

To achieve the above conditions in the combined effluents, a concentrated caustic extraction effluent is continuously formed by dividing the washer filtrate from the first caustic extraction stage into a caustic extraction effluent which is removed from the system and a portion which is reused for direct countercurrent washing. This caustic extraction effluent, having a pH of about 9–12, is combined with an acidic solution having a pH of less than about 1.5 to form a combined effluent having a volume of less than about 2,500 gallons per air dried ton of bleached pulp and a pH below about 2.8. Under these conditions, a precipitate is formed which removes therewith organic color bodies from the effluent.

After the precipitated organic material has been separated, e.g., in a clarifier, the effluent can be effectively treated with quite low lime dosages, usually about 2 to 8 g/l of lime being required. Moreover, the lime sludge which forms settles very quickly, e.g., in about 1 hour. As compared with the prior art procedures, the process of this invention produces a much lighter colored total bleachery effluent for a given dosage of lime and also provides greater COD and BOD reduction of the effluent.

The liquid effluent obtained after lime treatment can conveniently be treated with a $CO_2$-containing gas to precipitate excess lime as calcium carbonate. The $CO_2$ treatment can then be continued until the effluent has a pH of about 7. This neutral pH is, of course, highly desirable for discharge into natural water bodies.

It was also determined that if the concentrated caustic wash effluent and the acidic solution are combined in the presence of lime, the rate of settling of the precipitate for a given lime application is greatly decreased. This showed that it is highly beneficial to remove the lignin-degradation products before the effluents are contacted with lime.

DESCRIPTION OF THE PREFERRED EMBODIMENTS

According to a preferred embodiment, the acidic solution which is combined with the caustic extraction effluent is a concentrated chlorination stage effluent. This is preferably obtained as a portion of the filtrate from the first chlorination stage washer, with the balance of this filtrate being recycled to achieve the required degree of concentration.

In fact, the acidic component can be entirely from the chlorination stage, or partly from the chlorination stage and partly from an other source of waste acid or fresh acid or it can even be entirely from fresh acid. It is essential that when this acidic component is combined with the concentrated caustic extraction effluent, the combined effluent must have a volume of less than about 2,500 gallons per air dried ton of bleached pulp and a pH below about 2.8. Usually, at least one part by volume of concentrated caustic extraction effluent is used per part by volume of the acidic solution and usually the volume of concentrated caustic extraction effluent removed will be less than about 2,000 gallons per air dried ton of bleached pulp. According to a particularly preferred feature, the concentrated chlorination effluent has a pH of about 1 and the concentrated caustic extraction effluent has a pH of about 10-11.

It has also been found that the time required for precipitation to begin in the combined effluent decreased very markedly with increased concentration.

In terms of having a reasonably quick commencement of precipitation, it is preferable that the concentration of the combined effluent be less than about 2,000 gallons per air dried ton of bleached pulp (ADBT), with a concentration of less than about 1,700 gallons/ADBT being particularly preferred. Little advantage is obtained with concentrations below about 1,500 gallons/ADBT.

In a commercial-type procedure it was found that because of a small bleed from the acidic chlorination stage and a slow build-up of chlorination effluent concentration over a large number of cycles, the combined effluent was initially alkaline and gradually became more acidic with increasing concentration. By combining the effluents obtained it was found that when the pH of the combined effluent reached a level below about 3, precipitation commenced.

The novel process is applicable to any of the usual commercial chlorination-type bleaching systems. Typical of these are the $C_DEDED$, $D_CEDED$ and $C_DEHDED$ bleach sequences. With these systems it has been found to be particularly advantageous to concentrate the chlorination stage effluent and caustic extraction effluent such that they can be combined directly in the proportions in which they emerge from the bleachery. However, in the $D_CEDED$ sequence 70% of the total oxidizing power of the chlorination stage is chlorine dioxide and 30% is chlorine, giving a less acidic chlorination filtrate. This means that additional HCl must be added to bring the pH of the combined effluent below the required 2.8.

The invention is further illustrated by the following non-limitative examples as well as by the appended drawings in which.

Figure 1:
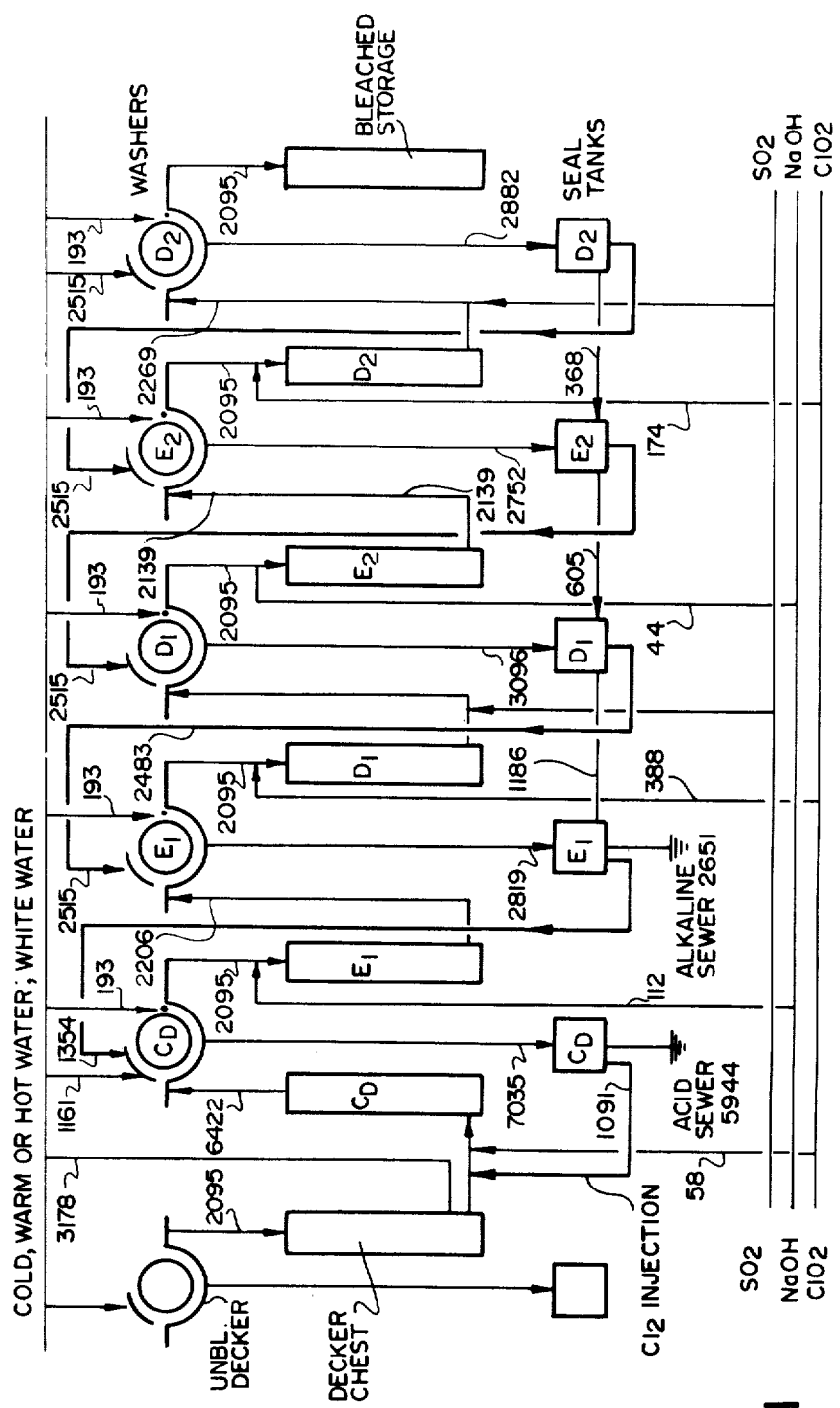
FIG. 1 is a flow sheet of the best commercial bleachery with water re-use generally in use today.

In the drawings, the various components are labelled and the numerals represent volumes of liquid in U.S. gal/ADBT. The effluents labelled as ACID SEWER and ALKALINE SEWER represent the "Chlorination Effluent" and "Extraction Effluent" referred to in the following examples and it is the combination of these two effluents which is referred to as the "Combined Effluent."

EXAMPLE 1

A series of different bleaching procedures were conducted both with and without direct countercurrent washing and chlorination stage recycle and the effluents were collected.

The bleaches were conducted on a northeastern softwood kraft pulp having the following properties:

TABLE 1

| | |
|---|---|
| Kappa No. | 24.3 |
| Roe No. | 3.98 |
| Viscosity | |
| Tappi 230, cp | 26.1 |
| Alpha Cellulose, % | 87.3 |
| Beta Cellulose, % | 5.64 |
| 7.14% NaOH solubility, % | 11.0 |
| Lignin, % | 3.36 |
| Resin, % | 0.15 |
| Copper Number, % | 3.30 |
| Ash, % | 0.603 |

The bleaching procedure followed was the usual $C_DE_1D_1E_2D_2$ and a control procedure was first run with no water re-use. This resulted in a total effluent volume of 18,979 USG/ADBT. Then three different procedures were followed with water re-use, the first of which simulated the best water re-use system now in commercial practice and the other two at progressively reduced volumes of bleachery effluents while maintaining pulp properties at market quality.

Procedure A

This procedure simulated the net result of the best present-day commercial conditions of countercurrent washing and chlorination filtrate recycle. In actual mill practice there is a large body of filtrate being recycled within each bleach stage for dilution of the pulp leaving the bleaching towers and for dilution of the pulp at the washer vat. In the laboratory only the net countercurrent flows were simulated. The laboratory procedure followed is shown in attached FIG. 1.

In this procedure the usual bleach stages $C_D$, $E_1$, $D_1$, $E_2$ and $D_2$ are used with their associated washers and seal tanks. The washer water can be either cold, warm or hot fresh water or white water from a pulp or paper machine.

Brown stock is fed to the unbleached decker where it is washed and thickened for high density storage in the decker chest. The high density pulp leaving the decker contains 2095 US gal of liquid/ADBT of pulp. At the bottom of the decker chest a further 3178 US gal of liquid/ADBT of pulp is added to dilute the brown stock which is then fed to the chlorination stage $C_D$. Chlorine gas is injected into 1091 US gal of recycled chlorination filtrate/ADBT which along with 58 gal of $ClO_2$ solution/ADBT is added to the pulp slurry before it enters the chlorination tower $C_D$. The stock from the chlorination tower $C_D$ is washed on washer $C_D$ with 1161 US gal of water applied on the first showers of the washer and 1354 US gal of filtrate from $E_1$ seal tank applied on the last showers of the washer. An additional 193 US gal of water is applied on the hydraulic doctors where the pulp leaves the washer. A total of 7035 US gal of filtrate/ADBT goes to the seal tank $C_D$ with 1091 US gal of this serving as chlorination filtrate recycle and 5944 US gal going to the acid sewer.

The stock from washer $C_D$, containing 2095 US gal of liquid/ADBT is fed to the first caustic extraction tower together with 112 gal of NaOH solution/ADBT. The caustic extracted stock is washed on $E_1$ washer with 2515 US gal of filtrate from $D_1$ seal tank/ADBT and 193 gal of water/ADBT is applied at the hydraulic doctor. 2819 US gal of filtrate/ADBT from $E_1$ washer is received in $E_1$ seal tank along with 1186 US gal of filtrate/ADBT from $D_1$ seal tank. Of this mixture in $E_1$ seal tank 1354 US gal is used for wash water on the $C_D$ washer 2651 gal goes to the alkaline sewer for each ADBT of pulp produced.

The stock from $E_1$ washer, containing 2095 gal of liquid/ADBT of pulp is fed to the first chlorine dioxide stage together with 388 US gal of chlorine dioxide solution/ADBT. The bleached stock leaving the tower is treated with a small amount of $SO_2$ as anti-chlor and is washed on the $D_1$ washer with 2515 gal of filtrate/ADBT from $E_2$ seal tank, with 193 US gal of water being applied on the hydraulic doctor. 3096 US gal of filtrate/ADBT from $D_1$ washer is received in $D_1$ seal tank along with 605 US gal of filtrate/ADBT from $E_2$ seal tank. This makes up the 2515 gal used on the sprays of $E_1$ washer and the 1186 gal flowing to $E_1$ seal tank for each ADBT of pulp produced.

The stock from $D_1$ washer, containing 2095 US gal of liquid/ADBT is fed to the second caustic extraction stage together with 44 gal of NaOH solution/ADBT. The stock from the $E_2$ tower is washed on $E_2$ washer with 2515 US gal of filtrate/ADBT from $D_2$ seal tank, with 193 gal of water/ADBT being applied on the hydraulic doctor. 2752 US gal of filtrate/ADBT from $E_2$ washer is received in $E_2$ seal tank along with 368 gal of filtrate/ADBT from $D_2$ seal tank. This makes up the 2515 gal of filtrate used on the sprays of $D_1$ washer and the 605 gal flow to the $D_1$ seal tank.

The stock from $E_2$ washer, containing 2095 US gal of liquid/ADBT, is fed to the second chlorine dioxide stage tower $D_2$ together with 174 gal of $ClO_2$ solution/ADBT. The fully bleached pulp leaving the tower is treated with a small amount of $SO_2$ anti-chlor and washed on the $D_2$ washer with 2515 US gal of fresh water/ADBT, with 193 gal of water/ADBT being applied on the hydraulic doctor. 2882 US gal of filtrate from $D_2$ washer goes to $D_2$ seal tank with 2515 US gal of this serving as wash liquid on $E_2$ washer and 368 US gal going to the $E_2$ seal tank. The stock from the $D_2$ washer, containing 2095 US gal of liquid/ADBT of pulp goes to bleached storage.

The bleaching conditions were as follows:
Chlorination ($C_D$):
 Chlorine applied was equal to 1.15 × Roe No., i.e., 4.32% $Cl_2$ plus 0.1% $ClO_2$ on pulp, Consistency: 3.5%, Temperature: 25° C, Retention Time: 1 hour.
Extraction $E_1$:
 NaOH: 2.5% on pulp, at 10% consistency, 80° C and for 1 hour.
Chlorine Dioxide $D_1$:
 $ClO_2$: 1% on pulp, at 8% consistency and 80° C. Retention time varied to obtain a $ClO_2$ residual of 0.025% on pulp.
Extraction $E_2$:
 NaOH: 1.0% on pulp, at 10% consistency, 80° C and for 1 hour.
Chlorine Dioxide $D_2$:
 $ClO_2$: 0.3% on pulp, at 9.3% consistency and 80° C. Retention time varied to obtain a $ClO_2$ residual of 0.025% on pulp.

After each chlorine dioxide treatment, $SO_2$ water was used as anti-chlor. The proper amount of $SO_2$ was controlled by redox potential.

After each stage the pulp was first thickened to 10% consistency and then washed by displacement with the proper amount of filtrate and/or water. The extent of displacement was characterized by the Displacement Ratio (D.R.) which is defined as $V/v$, where $V$ is the volume of liquor or water used for displacement and $v$ is the volume of water contained in the pulp leaving the washer. The consistency leaving the washer was always 10%.

The system was recycled until it approached steady state conditions.

Procedure B

Figure 2:
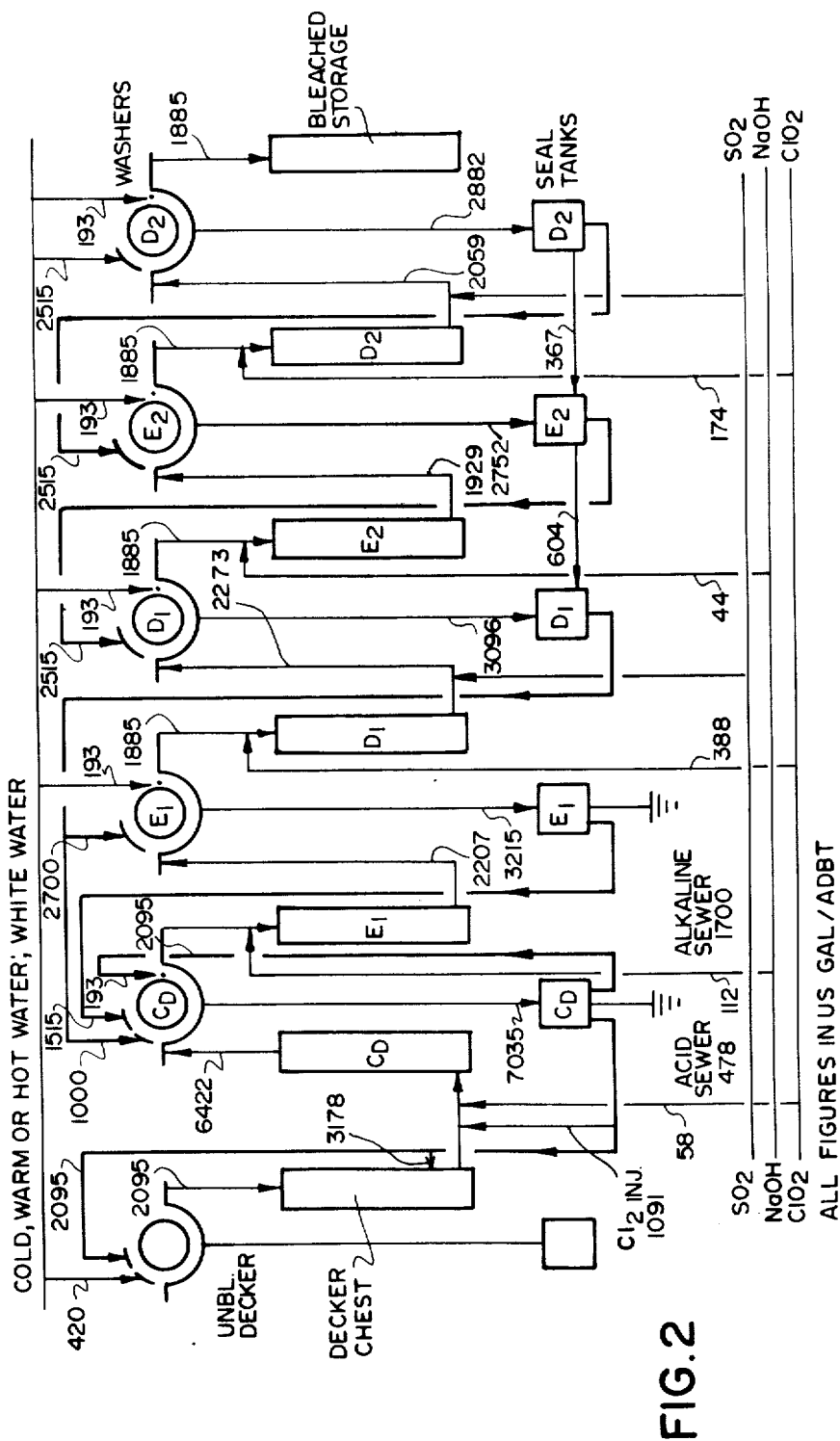
FIG. 2 is a flow sheet of one system for producing concentrated effluents.

For this procedure a very high degree of chlorination filtrate recycle was practised so that the volume of effluent from the chlorination stage was greatly reduced and reductions were also achieved in the extraction stage effluent. The procedure for this is shown in FIG. 2 and the bleaching conditions and results are given in Table 2.

This procedure used the same general equipment as described above for procedure A. However, the procedure is modified so that of the 7,035 gal/ADBT of filtrate received in seal tank $C_D$, only 478 gal goes to the acid sewer with the balance all being recycled. Of this cycle, 1,091gal goes to $Cl_2$ injection, 3,178 gal goes to decker chest dilution, 2,095 gal goes to the unbleached decker and 193 gal is used in the hydraulic doctor of washer $C_D$.

A reduction in effluent to the alkaline sewer was also achieved by complete counter-current washing in the first caustic extraction stage. This was done by eliminating the filtrate bleed from seal tank $D_1$ to seal tank $E_1$ and recycling part of the filtrate from seal tank $D_1$ to washer $C_D$ as well as washer $E_1$.

Procedure C

Figure 3:
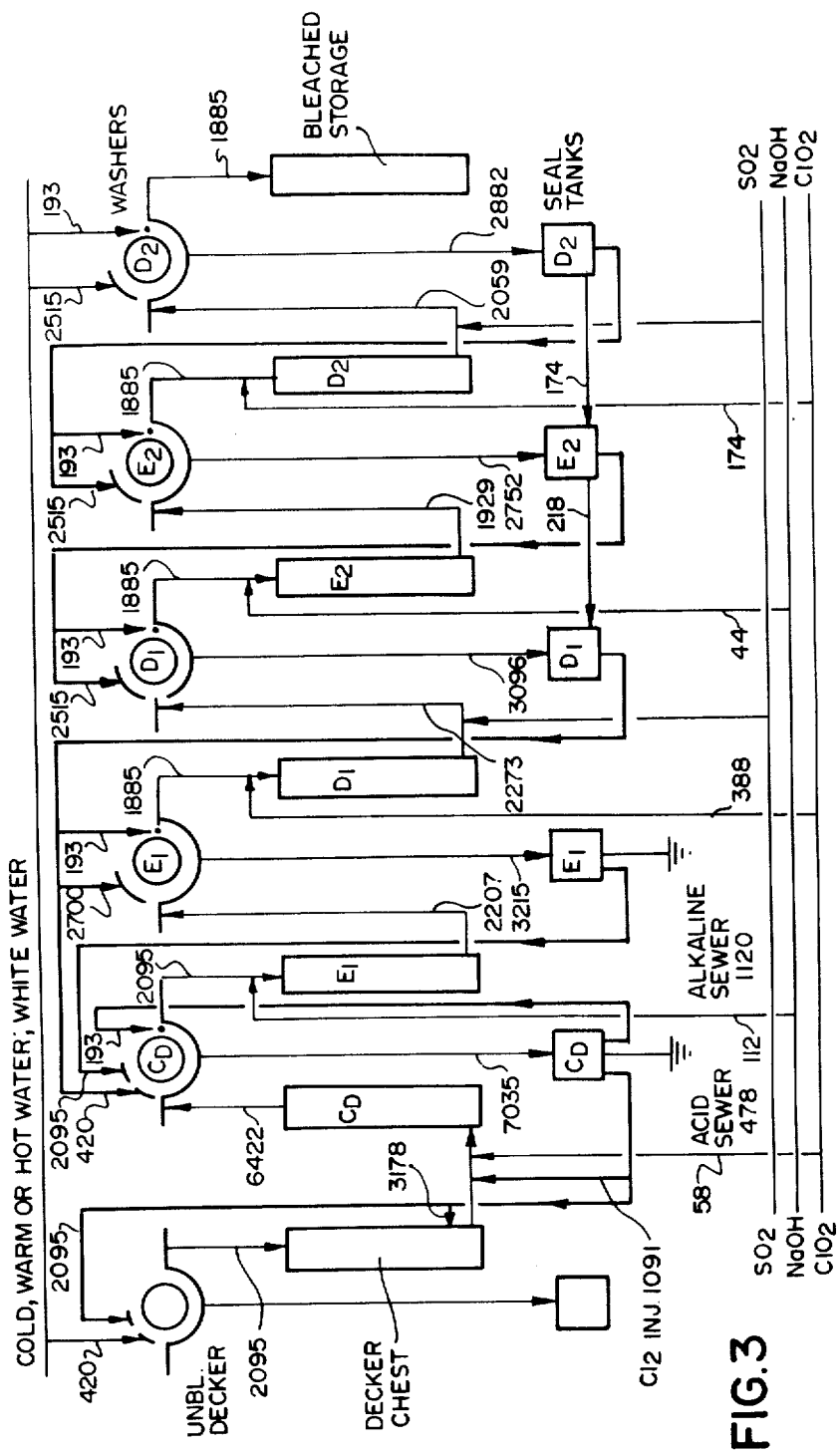
FIG. 3 is a flow sheet for a second system for producing concentrated effluents.

The procedure was again varied for even greater reduction in the volume of total bleachery effluent by further reduction of the extraction stage effluent. This procedure is shown in FIG. 3 and the bleaching conditions and results are given in Table 3.

total effluents. This is done by replacing fresh water with recycled filtrate in the hydraulic doctors of wash- Table 2

| Stage | Consistency % | Temperature °C | Retention Time hr. | Chemical % on pulp | Displacement Ratio | Consistency Leaving Washer % |
|---|---|---|---|---|---|---|
| $C_D$ | 3.5 | 25 | 1 | $Cl_2$ : 4.32 $ClO_2$ : 0.1 | 1.2 : 1 | 10 |
| $E_1$ | 9.7 | 80 | 1 | NaOH : 3.0 | 1.4 : 1 | 11 |
| $D_1$ | 8.4 | 80 | To Residual | $ClO_2$ : 1.2 | 1.3 : 1 | 11 |
| $E_2$ | 10.8 | 80 | 1 | NaOH : 1.0 | 1.3 : 1 | 11 |
| $D_2$ | 10.0 | 80 | To Residual | $ClO_2$ : 0.4 | 1.3 : 1 | 11 |

| Cycle Number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CHLORINATION $C_D$ | | | | | | | | | | | | | | |
| pH at Dump | 1.7 | 1.6 | 1.3 | 1.2 | 1.0 | 1.05 | 1.0 | 0.9 | 0.8 | 0.8 | 0.8 | 0.95 | 0.8 | 0.9 |
| $C_D$ Effluent, Chloride g/l | 1.107 | 2.109 | 3.013 | 3.900 | 4.697 | 5.300 | 6.027 | 6.523 | 6.824 | 7.356 | 7.710 | 7.817 | 8.419 | 8.703 |
| pH | 1.89 | 1.61 | 1.47 | 1.35 | 1.33 | 1.27 | 1.22 | 1.14 | 1.17 | 1.18 | 1.13 | 1.11 | 1.02 | 1.03 |
| EXTRACTION $E_1$ | | | | | | | | | | | | | | |
| NaOH Residual, % on pulp | 0.84 | 0.89 | 1.07 | 1.22 | 1.08 | 0.89 | 0.94 | 0.92 | 1.02 | 1.12 | 0.96 | 0.88 | 0.97 | 0.98 |
| Final pH | 10.7 | 10.9 | 10.7 | 10.8 | 10.6 | 10.2 | 10.4 | 10.5 | 10.4 | 10.6 | 10.3 | 10.2 | 10.6 | 10.3 |
| $E_1$ Effluent, Chloride g/l | 0.520 | 0.975 | 1.285 | 1.453 | 1.595 | 1.746 | 1.950 | 2.092 | 2.074 | 2.092 | 2.180 | 2.304 | 2.162 | 2.216 |
| pH | 11.31 | 11.41 | 11.43 | 11.49 | 11.38 | 11.12 | 11.35 | 11.31 | 11.32 | 11.45 | 11.21 | 11.19 | 11.33 | 11.22 |
| COMBINED EFFLUENT $C_D + E_1$ | | | | | | | | | | | | | | |
| pH | 9.87 | 8.07 | 7.02 | 6.11 | 4.75 | 3.71 | 3.81 | 3.56 | 4.10 | 3.68 | 3.19 | 3.14 | 2.84 | 2.69 |
| COD mg/l | 2007 | 2932 | 3624 | 3842 | 3979 | 3881 | 4262 | 4564 | 4955 | 4936 | 4864 | 5029 | 4965 | 4999 |
| $BOD_5$ mg/l | 273 | 381 | 546 | 597 | 603 | 672 | 636 | 603 | 600 | 642 | 672 | 669 | 672 | 648 |
| Dissolved Solids, g/l | 3.65 | 5.70 | 7.51 | 8.49 | 8.94 | 9.13 | 10.1 | 10.6 | 11.2 | 11.1 | 15.2 | 11.7 | 11.5 | 11.2 |
| Ash, g/l | 1.79 | 4.92 | 4.51 | 5.36 | 5.10 | 5.88 | 6.64 | 7.06 | 7.43 | 7.30 | 7.62 | 7.85 | 7.67 | 7.57 |
| Na, g/l | 0.599 | 1.049 | 1.574 | 2.006 | 1.758 | 2.186 | 2.373 | 2.553 | 2.783 | 2.698 | 2.763 | 2.808 | 2.806 | 2.635 |
| Chloride, g/l | 0.691 | 1.241 | 1.675 | 2.038 | 2.357 | 2.606 | 2.836 | 3.084 | 3.102 | 3.226 | 3.421 | 3.616 | 3.545 | 3.563 |
| Precipitate* | 0 | 0 | 0 | 0 | 0 | 0 | 0 | 0 | 0 | 0 | 0 | 0 | P | P |

*O - no precipitate   P - precipitate formed

Table 3

| Stage | Consistency % | Temperature °C | Retention Time hr. | Chemical % on pulp | Displacement Ratio | Consistency Leaving Washer % |
|---|---|---|---|---|---|---|
| $C_D$ | 3.5 | 25 | 1 | $Cl_2$ : 4.32 $ClO_2$ : 0.10 | 1.2 : 1 | 10 |
| $E_1$ | 9.7 | 80 | 1 | NaOH : 3.0 | 1.4 : 1 | 11 |
| $D_1$ | 8.4 | 80 | To Residual | $ClO_2$ : 1.2 | 1.3 : 1 | 11 |
| $E_2$ | 10.8 | 80 | 1 | NaOH : 1.0 | 1.3 : 1 | 11 |
| $D_2$ | 10.0 | 80 | To Residual | $ClO_2$: 0.40 | 1.3 : 1 | 11 |

| Cycle Number | 1 | 2 | 3 | 4 | 5 | 6 | 7 | 8 | 9 | 10 | Control |
|---|---|---|---|---|---|---|---|---|---|---|---|
| CHLORINATION $C_D$ | | | | | | | | | | | |
| pH at Dump | 1.6 | 1.4 | 1.3 | 1.2 | 1.1 | 1.1 | 1.1 | 0.9 | 0.9 | 0.9 | 1.8 |
| $C_D$ Seal Tank Effluent, Chloride g/l | 1.108 | 2.145 | 3.191 | 4.165 | 3.545 | 5.761 | 6.470 | 6.913 | 7.462 | 8.047 | 1.090 |
| pH | .187 | 1.62 | 1.43 | 1.39 | 1.29 | 1.26 | 1.18 | 1.17 | 1.10 | 1.06 | 1.82 |
| EXTRACTION $E_1$ | | | | | | | | | | | |
| NaOH Applied, % on pulp | 3.0 | 3.0 | 3.0 | 3.0 | 3.0 | 3.0 | 3.0 | 3.0 | 3.0 | 3.0 | 2.5 |
| NaOH Residual, % on pulp | 0.71 | 0.93 | 1.09 | 1.4 | 1.23 | 1.54 | 1.22 | 1.00 | 1.15 | 1.17 | 0.67 |
| Final pH (Hot) | 10.7 | 10.9 | 10.7 | 10.5 | 10.9 | 10.6 | 10.1 | 10.3 | 10.4 | 10.5 | 10.3 |
| $E_1$ Seal Tank Effluent, Chloride g/l | 0.561 | 1.034 | 1.462 | 1.773 | 2.038 | 2.145 | 2.340 | 2.446 | 2.588 | 2.588 | 0.525 |
| pH | 11.39 | 11.48 | 11.41 | 11.45 | 11.57 | 11.51 | 11.37 | 11.34 | 11.19 | 11.29 | 11.22 Total Effluent |
| COMBINED EFFLUENT $C_D + E_1$ | | | | | | | | | | | |
| pH | 8.97 | 7.35 | 5.79 | 4.74 | 4.37 | 3.72 | 3.13 | 2.96 | 2.77 | 2.42 | 2.61 |
| COD, mg/l | 1885 | 2980 | 3916 | 4533 | 4980 | 5119 | 5370 | 5717 | 6071 | 5898 | 863 |
| BOD (5 days) mg/l | 264 | 375 | 531 | 594 | 624 | 660 | 885 | 945 | 915 | 954 | 198 |
| Dissolved Solids, g/l | 3.42 | 5.85 | 6.02 | 9.51 | 10.6 | 16.93 | 11.77 | 12.65 | 13.33 | 13.30 | 1.48 |
| Ash, g/l | 1.54 | 2.89 | 3.43 | 5.56 | 6.78 | 11.37 | 7.50 | 8.03 | 8.07 | 8.45 | 0.78 |
| Na, g/l | 0.691 | 0.876 1.236 | 2.210 | 2.596 | 2.430 | 2.665 | 2.834 | 2.903 | 3,000 | 0.279 | |
| Chloride, g/l | 0.734 | 1.323 | 1.967 | 2.499 | 2.889 | 3.137 | 3.474 | 3.846 | 3.988 | 4.219 | 0.579 |
| Precipitate * | 0 | 0 | 0 | 0 | 0 | 0 | 0 | 0 | P | P | |

* O - no precipitate  P - precipitated formed

This procedure incorporated all of the modifications of Procedure B (FIG. 2) but with further reductions in total effluents. This is done by replacing fresh water with recycled filtrate in the hydraulic doctors of washers $C_D$, $E_1$, $D_1$ and $E_2$, increasing the filtrate recycle from seal tank $E_1$ to washer $C_D$ and decreasing the filtrate bleed from seal tank $D_2$ to seal tank $E_2$ and from seal tank $E_2$ to seal tank $D_1$.

A comparison of the characteristics of the effluents at steady state conditions are shown in the following Table 4.

Table 4

|  | Control No Water Reuse | Procedure A | Procedure B | Procedure C |
|---|---|---|---|---|
| Total Effluents |  |  |  |  |
| US gal/ADBT | 18979 | 8595 | 2178 | 1598 |
| Chlorination Effluent |  |  |  |  |
| U.S. gal/ADBT |  | 5944 | 478 | 478 |
| pH | 1.82 | 1.75 | 1.05 | 1.03 |
| COD lb/ADBT |  | 33.0 | 16.5 | 19.2 |
| BOD₅ lb/ADBT |  | 12.9 | 4.0 | 4.3 |
| Dissolved Solids lb/ADBT |  | 50.1 | 26.1 | 33.3 |
| Na lb/ADBT |  | 1.02 | 2.6 | 3.9 |
| Cl lb/ADBT |  | 65.1 | 37.2 | 45.1 |
| Acidity, NaOH lb/ADBT |  | 68.9 | 38.2 | 43.5 |
| Extraction Effluent |  |  |  |  |
| US gal/ADBT |  | 2651 | 1700 | 1120 |
| pH | 11.22 | 10.52 | 10.68 | 10.3 |
| COD lb/ADBT/ |  | 66.3 | 72.4 | 66.0 |
| BOD₅ lb/ADBT |  | 12.7 | 9.8 | 8.9 |
| Dissolved Solids lb/ADBT |  | 177.9 | 173.1 | 153.6 |
| Na lb/ADBT |  | 30.6 | 45.2 | 30.1 |
| Cl lb/ADBT |  | 29.0 | 33.4 | 26.4 |
| Alkalinity, NaOH lb/ADBT |  | 6.7 | 7.7 | 6.7 |
| Combined Effluent |  |  |  |  |
| pH | 2.61 | 2.15 | 2.35 | 1.96 |
| COD, lb/ADBT | 136.7 | 103.5 | 89.4 | 85.5 |
| BOD₅, lb/ADBT | 31.3 | 21.7 | 13.8 | 13.4 |
| Dissolved Solids, lb/ADBT | 234.4 | 229.5 | 205.3 | 192.4 |
| Na lb/ADBT | 44.2 | 41.5 | 48.3 | 42.9 |
| Cl lb/ADBT | 91.7 | 97.5 | 70.4 | 68.7 |
| Acidity, NaOH lb/ADBT | — | 55.9 | 23.1 | 28.4 |

When the effluents were combined, it was found that the effluents from Procedures B and C formed a quick settling precipitate while no precipitate was formed in the combined effluents of the Control of Procedure A. The extraction effluent from Procedure A and the chlorination effluent from Procedure B, on being mixed also formed a precipitate. It was also observed from studies on Procedures B and C that before a precipitate formed the effluents had to reach a certain minimum concentration and the pH of the combined effluent had to be below about 3. As the recycling in Procedures B and C was continued, the pH of the combined effluents gradually decreased and when the pH reached a value below about 3 the precipitation commenced.

In Procedure C, the combined effluent was analyzed at the point when precipitation commenced as well as at a point after steady state was reached. The results are shown in Table 5 below and in this table at steady state the combined effluent was analyzed both with the precipitate still present and after it had been removed.

Table 5

|  | Control | Start of Precipitate | Steady State As Is | Steady State Precipitate Removed |
|---|---|---|---|---|
| Effluent Volume USG/ADT: | 18979 | 1598 | 1598 | 1598 |
| pH | 2.61 | 2.77 | 1.96 | 2.16 |
| COD, mg/l | 863 | 6071 | 6411 | 4732 |
| BOD, mg/l | 198 | 915 | 1002 | 1062 |
| Dissolved Solids, g/l | 1.48 | 13.33 | 14.43 | 13.52 |
| Ash, g/l | — | 8.07 | 8.77 | 9.54 |
| Na, g/l | 0.279 | 2.903 | 3.215 | 3.434 |
| Chloride g/l | 0.579 | 3.988 | 5.149 | 5.096 |
| COD, lb/ADBT of pulp | 136.7 | — | 85.5 | 63.1 |
| BOD₅, lb/ADBT of pulp | 31.3 | — | 13.4 | 14.2 |

The combined effluents at steady state also diluted with fresh water to the volume of the control sample and the pH was adjusted to 7.6. The colors were then compared using Spectrophotometric Method 206A as described in "Standard Methods for the Examination of Water and Waste Water" 13th Ed., American Public Health Association, American Water Work Association, Water Pollution Control Federation. The results obtained are shown below in Table 6.

Table 6

|  | Control | Steady State As Is | Steady State Precipitate Removed |
|---|---|---|---|
| Luminance, % | 47.0 | 55.7 | 78.8 |
| Dominant Wavelength, nm | 580 | 579 | 576 |
| Purity % | 57 | 48 | 23 |
| APHA Unit mg Pt/l | 2100 | 1780 | 750 |

From the above data it will be seen that the removal of the precipitate represents a 58% reduction in color of the effluent from a bleachery using countercurrent washing and chlorination stage filtrate recycle to produce concentrated effluents. When compared with the color of the effluent from a bleachery with no water re-use the procedure of this invention shows a color reduction of 64%.

EXAMPLE 2

Using the concentrated effluents obtained from Procedure C in Example 1, three different lime treatments were carried out.

Treatment A

The concentrated caustic effluent at 70° C was mixed with the concentrated chlorination effluent at about 25° C in the proportions in which they were obtained, i.e., about 30 parts by volume of chlorination effluent to about 70 parts by volume of caustic effluent. A flocculant precipitate of lignin based materials was obtained and this precipitate settled to the bottom of the container in about 20 minutes. The precipitate on drying weighed 1.3 g/l of the mixture of concentrated caustic and chlorination effluents. The supernatant liquid was removed and treated with varying amounts of a lime containing about 75% CaO, 20% Ca(OH)₂ and 5% CaCO₃. The actual amounts of this lime used are tabulated in Table 7.

Attempts were made to determine the settling time of the lime sludge at the different lime dosages. For this, the lime slurry was transferred into 200 ml stoppered graduated cylinders and thoroughly agitated to obtain a uniform mixture. In every instance about 150 ml of lime slurry was used and the time required to obtain about 135 ml (90% of the total volume of slurry) of clear supernatant liquid in the graduated cylinder was determined. For the purposes of the present test program, the sludge settling time was assumed to be the time required to obtain 135 ml (or 90% of the total volume of slurry) of clear supernatant liquid. All tests were run under identical conditions.

The lime treated solutions were filtered under gravity using Whatman filter paper. A gentle air pressure of about 6.8 cm (Hg) was applied towards the end of each filtration to facilitate drainage of liquid from the sludge.

Carbon dioxide containing gas, e.g., flue gas was dispersed through the filtrate obtained using a sintered glass bubbler. A precipitate of $CaCO_3$ was formed and this was removed at about pH 9.5 and the gas was continued to pass through the solution to achieve pH 7.0. The color measurements and analyses for COD and $BOD_5$ were carried out on all the effluents at pH 7.6. The results obtained are shown in Table 7.

Treatment B

This procedure was carried out to determine the effect of combining the two concentrated effluents in the presence of lime. The same concentrated effluents were used as in Treatment A and the two concentrated effluents and lime were all mixed together simultaneously. The lime was used in an amount of 4.48 g/l based on the total effluent mixture. An attempt was made to determine a settling time of lime sludge using the procedure as described above in Treatment A.

However, there was no separation of clear supernatant liquid from the lime slurry even after 2 hours. Thus, there appeared to be no settling of lime sludge. This is a very distinct disadvantage of Treatment B as compared to Treatment A which followed the process of the invention. Thus, at the same level of lime addition (about 4.5 g/l) the process of the invention produced quite favourable settling times for lime sludge. The lime slurry in Treatment B had to be centrifuged. The supernatant liquid thus obtained was treated with $CO_2$ in the next stage in the same manner as described in Treatment A. The pH of the effluent was 7.0. The results of determinations of COD, BOD and color of the effluent are listed in Table 7.

Treatment C

As another comparison, a test was conducted with lime being added to the concentrated caustic extract. This procedure is very similar to that described in prior art U.S. Pat. No. 3,531,370 except no fibers were added to promote settling.

An appropriate amount of lime was added to the concentrated caustic effluent to produce the amounts of lime in the combined effluent stated in Table 7. The lime sludge did not settle even after 2 hours and there was no separation of clear supernatant liquid. The lime slurry was then centrifuged and the supernatant liquid was treated with concentrated chlorination effluent in the ratio of about 70 parts by volume of caustic effluent to about 30 parts by volume of chlorination effluent. The effluent thus obtained was acidic and the pH of this effluent was adjusted to about 7 prior to the measurement of its color and determination of COD and BOD. The results are shown in Table 7.

Table 7

| Sample | Lime added g/l of mixture | pH of lime treated soln. | Lime Sludge Settling Time min. | Colour Description by Spectrophotometric Method 206A | | | COD mg/l | $BOD_5$ mg/l |
| --- | --- | --- | --- | --- | --- | --- | --- | --- |
| | | | | Luminance % | Dominant Wave Length nm | Purity % | | |
| Concentrated Caustic Ext. ($E_1$) | — | — | — | 0.7 | 620 | 100 | 7023 | 1014 |
| Concentrated Chlorination Ext. ($C_n$) | — | — | — | 27.0 | 582 | 72 | 5254 | 1023 |
| Mixture $E_1/C_n$= 70/30 | — | — | — | 6.2 | 593 | 99 | 5527 | 903 |
| | 2.26 | 10.2 | >120 | 22.6 | 587 | 93 | 4028 | 840 |
| | 2.41 | 11.0 | >120 | 53.2 | 580 | 70 | 3308 | 834 |
| Treatment A | 3.60 | 11.7 | 60 | 85.3 | 575 | 30 | 2316 | 816 |
| | 4.47 | 12.0 | 60 | 84.0 | 575 | 31 | 2229 | 750 |
| | 8.0 | 12.1 | 43 | 88.4 | 575 | 20 | 2158 | 738 |
| Treatment B | 4.48 | 10.8 | No Settling | 68.7 | 577 | 55 | 2664 | |
| Treatment C | 4.48 | 12.45 | No Settling | 27.5 | 584 | 85 | 4195 | 930 |

From the above results it will be seen that at a lime treatment of 4.5 g/l or less a much greater reduction in color of the effluent is achieved by the process of the invention (Treatment A) as compared with Treatments B and C. Also, a much improved lime sludge settling time is achieved by this lime addition level using the process of this invention. Moreover, much greater reductions in COD and BOD of the effluent are achieved at this same lime treatment level using the process of the invention.

As a further example of the advantages of this invention, there is given below a comparison of the lime requirements for treatment of effluent from a 700 tons/day bleachery according to this invention and the usual massive lime treatments used heretofore:

Table 8

| Process | Origin of Effluent | Vol. of Effluent USG/ADT | Vol. of Effluent Gal/Day | Tons of Lime per Day |
| --- | --- | --- | --- | --- |
| Invention | Total Bleachery | 1600 | 1,100,000 | 16 |

Table 8-continued

| Process | Origin of Effluent | Vol. of Effluent USG/ADT | Vol. of Effluent Gal/Day | Tons of Lime per Day |
| --- | --- | --- | --- | --- |
| Massive Lime | Extraction Stage | 2500 | 1,750,000 | 130 |
| Massive Lime | Total Bleachery | 8000 | 5,600,000 | 418 | for all samples.

Each supernatant filtrate from acid flocculation was subjected to a lime treatment and each supernatant filtrate from lime treatment was subjected to $CO_2$ treatment until the pH of the solution was 10 – 10.5. The effluent thus obtained was then subjected to analysis. The treatment conditions and results obtained are set out in Table 9 below:

TABLE 9

| Number | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Original Solution | | | | | | | | | | | | | |
| Dilution, US gal/ADBT | 1500 | 1720 | 1720 | 2250 | 2250 | 2250 | 2250 | 2250 | 2250 | 2250 | 2780 | 2780 | 3000 |
| pH of mixed solns. ($C_D/E_1$=0.5) at 65° C | 2.2 | 2.2 | 2.4 | 2.4 | 2.3 | 2.3 | 2.3 | 2.6 | 2.6 | 2.4 | 2.4 | 2.5 | 2.5 |
| Colour, Pt, lb/ADBT | 336 | 317 | 344 | 299 | 273 | 311 | 308 | 332 | 350 | 332 | 275 | 297 | 273 |
| COD, lb/ADBT | 84 | 78 | 85 | 81 | 61 | 78 | 79 | 85 | 74 | 83 | 92 | 85 | 77 |
| BOD, lb/ADBT | 19 | 16 | 16 | 18 | 21 | 13 | 18 | 17 | 38 | 18 | 32 | 14 | 17 |
| Total Solids, lb/ADBT | 230 | 232 | 239 | 230 | 184 | 219 | 234 | 239 | 233 | 263 | 281 | 248 | 229 |
| Acid Flocculation | | | | | | | | | | | | | |
| Time to Begin Floc., min | Immediate | 4 | 5 | 55 | ~130 | 89 | 20 | 120 | 95 | 68 | No Floc | No Floc | No Floc |
| Time to Settle 80–90% Floc. min | 85 | 103 | 110 | ~130 | >150 | >150 | 95 | >150 | >120 | >130 | N.S. | N.S. | N.S. |
| Colour(Supernatant Filt.)Pt. lb/ADBT | 207 | 204 | 256 | 219 | 213 | 222 | 219 | 255 | 327 | 234 | 278 | 309 | 290 |
| % Colour Reduction | 38.2 | 35.7 | 25.7 | 26.7 | 21.8 | 28.6 | 28.9 | 23.2 | 6.4 | 29.5 | nil | nil | nil |
| Wt. of Floc Settled, lb/ADBT | 13 | 10 | 8 | 5 | 1.7 | 4 | 8 | 2.7 | 2.8 | 5 | nil | nil | nil |
| Lime Treatment at 65° C | | | | | | | | | | | | | |
| Lime Added, g/l | 4.0 | 2.9 | 5.1 | 2.5 | 4.0 | 4.0 | 4.0 | 4.0 | 4.0 | 5.5 | 2.9 | 5.1 | 4.0 |
| Lime Added, lb/ADBT | 50.0 | 42.1 | 72.6 | 46.9 | 75.0 | 75.0 | 75.0 | 75.0 | 75.0 | 103.1 | 68.2 | 117.2 | 100.0 |
| Time to Settle 80–90% Sludge, min | 55 | 53 | ~65 | 50 | ~60 | 55 | 55 | ~60 | ~60 | ~60 | ~60 | 53 | ~60 |
| pH of Supernatant | 11.5 | 11.8 | 12.0 | 11.4 | 11.8 | 11.8 | 11.9 | 11.9 | 11.9 | 11.9 | 11.7 | 12.0 | 11.9 |
| Colour (Supernatant Filt.) Pt. lb/ADBT | 32 | 54 | 25 | 39 | 32 | 35 | 26 | 30 | 33 | 21 | 32 | 23 | 32 |
| % Colour Reduction | 90.6 | 83.0 | 92.8 | 86.9 | 88.3 | 89.8 | 91.5 | 91.1 | 90.7 | 93.5 | 88.5 | 92.1 | 88.4 |
| Wt. of Lime Sludge, lb/ADBT | 55 | 45 | 86 | 51 | 83 | 83 | 79 | 87 | 90 | 117 | 162 | 129 | 102 |
| $CO_2$ Treatment | | | | | | | | | | | | | |
| Time to Settle 80–90% $CaCO_3$ Sludge, min | 30 | >30 | ~30 | ~35 | ~30 | 30 | 30 | ~35 | ~20 | 23 | ~30 | 12 | ~30 |
| Wt. of $CaCO_3$ Sludge lb/ADBT | 12 | 6 | 29 | 13 | 24 | 26 | 25 | 26 | 25 | 35 | 21 | 42 | 36 |
| Effluent | | | | | | | | | | | | | |
| Colour (Filtered Effl.)Pt. lb/ADBT | 29 | 37 | 21 | 36 | 24 | 23 | 21 | 23 | 33 | 24 | 29 | 24 | 30 |
| % Colour Reduction | 91.3 | 88.4 | 94.0 | 87.8 | 91.3 | 92.7 | 93.3 | 92.9 | 90.7 | 92.9 | 89.3 | 92.0 | 89.1 |
| COD, lb/ADBT | 50 | 44 | 38 | 45 | 38 | 36 | | 41 | 40 | 38 | 53 | 38 | 47 |
| % COD Reduction | 49.5 | 43.5 | 54.9 | 44.1 | 38.8 | 54.5 | | 51.3 | 45.9 | 54.1 | 42.4 | 55.3 | 38.5 |
| $BOD_5$, lb/ADBT | 19 | 15 | 15 | 15 | 13 | | | 15 | 18 | 15 | 20 | | 16 |
| % $BOD_5$ Reduction | 2.3 | 8.1 | 9.0 | 17.8 | 40.2 | | | 12.3 | 54.1 | 16.6 | 35.7 | | 1.8 |
| Total Solids lb/ADBT | 208 | 210 | 203 | 180 | 163 | 205 | 205 | 207 | 201 | 197 | 240 | 202 | 193 |
| % Total Solids Reduction | 9.8 | 9.4 | 15.1 | 21.5 | 11.8 | 6.5 | 12.6 | 13.6 | 13.7 | 25.1 | 14.4 | 18.3 | 15.7 |
| Calcium as CaO, lb/ADBT | 19.8 | 22.2 | 16.4 | 21.3 | 18.5 | 21.3 | 26.5 | 18.9 | 16.7 | 17.1 | 24.2 | 18.6 | 17.8 |
| Colour Removal | | | | | | | | | | | | | |
| Pt, lb/lb of Lime Added | 6.1 | 6.7 | 4.5 | 5.6 | 3.3 | 3.8 | 3.8 | 4.1 | 4.2 | 3.0 | 3.6 | 2.3 | 2.4 |

N.S. – No Settling

It will be seen that not only is lime requirement greatly decreased but also the actual volume of effluent is very significantly decreased.

EXAMPLE 3

A series of different concentrated combined effluents were obtained by the same general procedure described in Example 1, Procedure C, using the $C_DEHDED$ bleach sequence with tight countercurrent washing, in other words, a hypochlorite (H) stage was added to the original bleaching sequence. The dilutions of these effluents ranged from 1500 to 3000 gal/ADBT with pH's ranging from 2.2 to 2.6. The ratio of chlorination effluent: alkaline extraction effluent was 0.5:1

EXAMPLE 5

Using the same $C_DEHDED$ bleach sequence as in Example 4a and countercurrent washing, a concentrated chlorination ($C_D$) effluent and a concentrated extractor stage ($E_1$) effluent were obtained. These were mixed in the ratio of 2 parts by volume $E_1$ to 1 part by volume $C_D$, with mixed effluent dilutions of 1500, 2250 and 3000 gal/ADBT.

Three mixed effluents of the above dilutions were also prepared by substituting the chlorination effluent $C_D$ with HCl of corresponding acidity.

The results shown in Table 10 below confirm that the concentrated chlorination effluent ($C_D$) can be completely replaced by fresh acid.

TABLE 10

| Number | 1 | 2 | 3 | 4 | 5 | 6 |
| --- | --- | --- | --- | --- | --- | --- |
| Original Solution | | | | | | |
| Dilution, U.S. gal./ADBT | 1500 | 1500 | 2250 | 2250 | 3000 | 3000 |
| The Solution Mixed with $E_1$ Extract. | $C_D$ | HCl | $C_D$ | HCl | $C_D$ | HCl |
| pH Of Mixed Solns. at 65° C | 2.4 | 2.3 | 2.6 | 2.5 | 2.7 | 2.5 |
| Colour, Pt, lb/ADBT | 375 | 279 | 305 | 290 | 314 | 277 |
| COD, lb/ADBT | 26 | 38 | 38 | 38 | 50 | 50 |
| BOD, lb/ADBT | 20 | 16 | 17 | 14 | 19 | 12 |

TABLE 10-continued

| Number | 1 | 2 | 3 | 4 | 5 | 6 |
|---|---|---|---|---|---|---|
| Total Solids, lb/ADBT | 229 | 202 | 239 | 199 | 180 | 150 |
| Acid Flocculation | | | | | | |
| Time to Begin Floc., min | 4 | 11 | 117 | No Floc | No Floc | No Floc |
| Time to Settle 80–90% Floc, min | 100 | ~100 | >120 | N.S. | N.S. | N.S. |
| Colour (Filt.Supernatant) Pt, lb/ADBT | 288 | 184 | 312 | 283 | 316 | 290 |
| % Colour Reduction | 23.2 | 34.0 | (+2.4) | 2.6 | (+0.6) | (+4.9) |
| Wt. of Floc Settled, lb/ADBT | 7 | 6 | 0.6 | Nil | Nil | Nil |
| Lime Treatment at 65° C | | | | | | |
| Lime Added, g/l | 4.0 | 4.0 | 4.0 | 4.0 | 4.0 | 4.0 |
| Lime Added, lb/ADBT | 50.0 | 50.0 | 75.0 | 75.0 | 100.0 | 100.0 |
| Time to Settle 80–90% Sludge, min | ~55 | ~55 | ~60 | ~60 | ~60 | ~60 |
| pH of Supernatant | 11.3 | 11.9 | 11.8 | 11.9 | 11.9 | 11.9 |
| Colour (Filt. Supernatant) Pt, lb/ADBT | 34 | 31 | 30 | 30 | 32 | 29 |
| % Colour Reduction | 91.0 | 88.8 | 90.2 | 89.6 | 89.9 | 89.6 |
| Wt. of Lime Sludge, lb/ADBT | 60 | 50 | 86 | 77 | 109 | 97 |
| $CO_2$ Treatment | | | | | | |
| Time to Settle 80–90% $CaCO_3$ Sludge, min | ~25 | >30 | ~30 | 30 | 30 | 30 |
| Wt. of $CaCO_3$ Sludge, lb/ADBT | 13 | 19.4 | 27 | 30 | 38 | 41 |
| Effluent | | | | | | |
| Colour (Filt.Effluent) Pt, lb/ADBT | 35 | 26 | 26 | 38 | 36 | 28 |
| % Colour Reduction | 90.6 | 90.8 | 91.4 | 86.9 | 88.7 | 89.9 |
| COD, lb/ADBT | 25 | 37 | 37 | 19 | 25 | 25 |
| % COD Reduction | 1.3 | 2.6 | 2.1 | 50.4 | 50.1 | 50.0 |
| $BOD_5$, lb/ADBT | 17 | | 17 | 11 | 17 | |
| % $BOD_5$ Reduction | 14.5 | | 0 | 21.3 | 7.3 | |
| Total Solids, lb/ADBT | 199 | 167 | 204 | 165 | 150 | 126 |
| % Total Solids Reduction | 13.0 | 18.1 | 14.6 | 17.0 | 16.7 | 16.3 |
| Calcium as CaO, lb/ADBT | 15.6 | 13.0 | 17.6 | 12.8 | 13.1 | 9.3 |
| Colour Removed | | | | | | |
| Pt, lb/lb of Lime Added | 6.8 | 5.1 | 3.7 | 3.4 | 2.8 | 2.5 |

$C_D$ - Chlorination Filtrate    $E_1$ - Extraction Stage Filtrate    N.S. - No Settling The embodiments of the invention in which an exclusive property or privilege is claimed are defined as follows:

1. In a pulp mill bleaching process wherein a pulp slurry is subjected to at least a first chlorination treatment followed by at least a first caustic extraction treatment, each said treatment being followed by a washing and filtration stage, the improvement which comprises reusing a portion of the first caustic extraction stage filtrate for direct countercurrent washing to increase the concentration of the filtrate, removing the balance of said filtrate as a concentrated caustic extraction effluent having a pH of about 9 to 12 and a volume of less than 2,000 gallons per air dried ton of bleached pulp, and combining said concentrated caustic extraction effluent with a concentrated chlorination effluent obtained by recycling the chlorination stage washer filtrate until the pH is less than 1.5, said effluents being combined in a ratio of at least one part by volume of concentrated caustic extraction effluent per part by volume of chlorination effluent and being combined prior to any lime treatment to form a combined effluent having a volume of less than about 2500 gallons per air dried ton of bleached pulp and a pH below about 2.8, to form a precipitate which removes organic color bodies from the combined effluent.

2. A process according to claim 1 wherein the combined effluent has a volume of less than about 2000 gallons/ADBT.

3. A process according to claim 1 wherein the combined effluent has a volume of about 1500–1700 gallons/ADBT.

4. A method according to claim 1 wherein the concentrated chlorination effluent has a pH of about 1 and the concentrated caustic extraction effluent has a pH of about 10–11.

5. A method according to claim 1 wherein the combined effluent, after removal of precipitate, is further processed for additional color removal.

6. A method according to claim 5 wherein the additional color is removed by contacting the effluent with 2 to 8 g/l lime to precipitate additional color material.

7. A method according to claim 6 wherein the effluent, after lime precipitation, is contacted with a $CO_2$-containing gas to precipitate out residual lime and adjust the effluent pH to about neutral.

8. A process according to claim 1 wherein additional mineral acid is added to lower the combined effluent pH to below 2.8.

* * * * *